Aug. 8, 1939.    M. CARRASCO-SÁNCHEZ    2,168,672
MOTOR
Filed Sept. 19, 1936    3 Sheets-Sheet 1
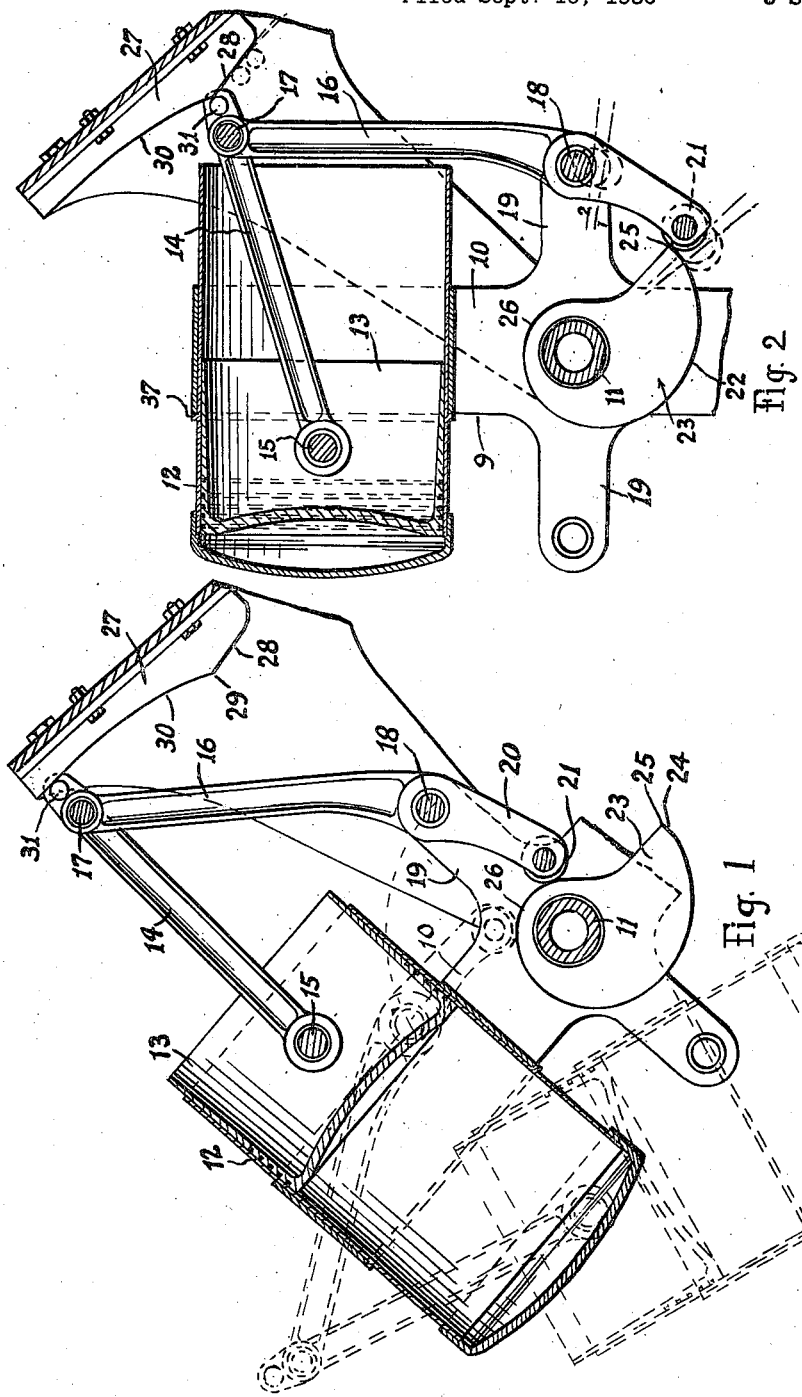
INVENTOR
Manuel Carrasco-Sánchez
BY
ATTORNEY

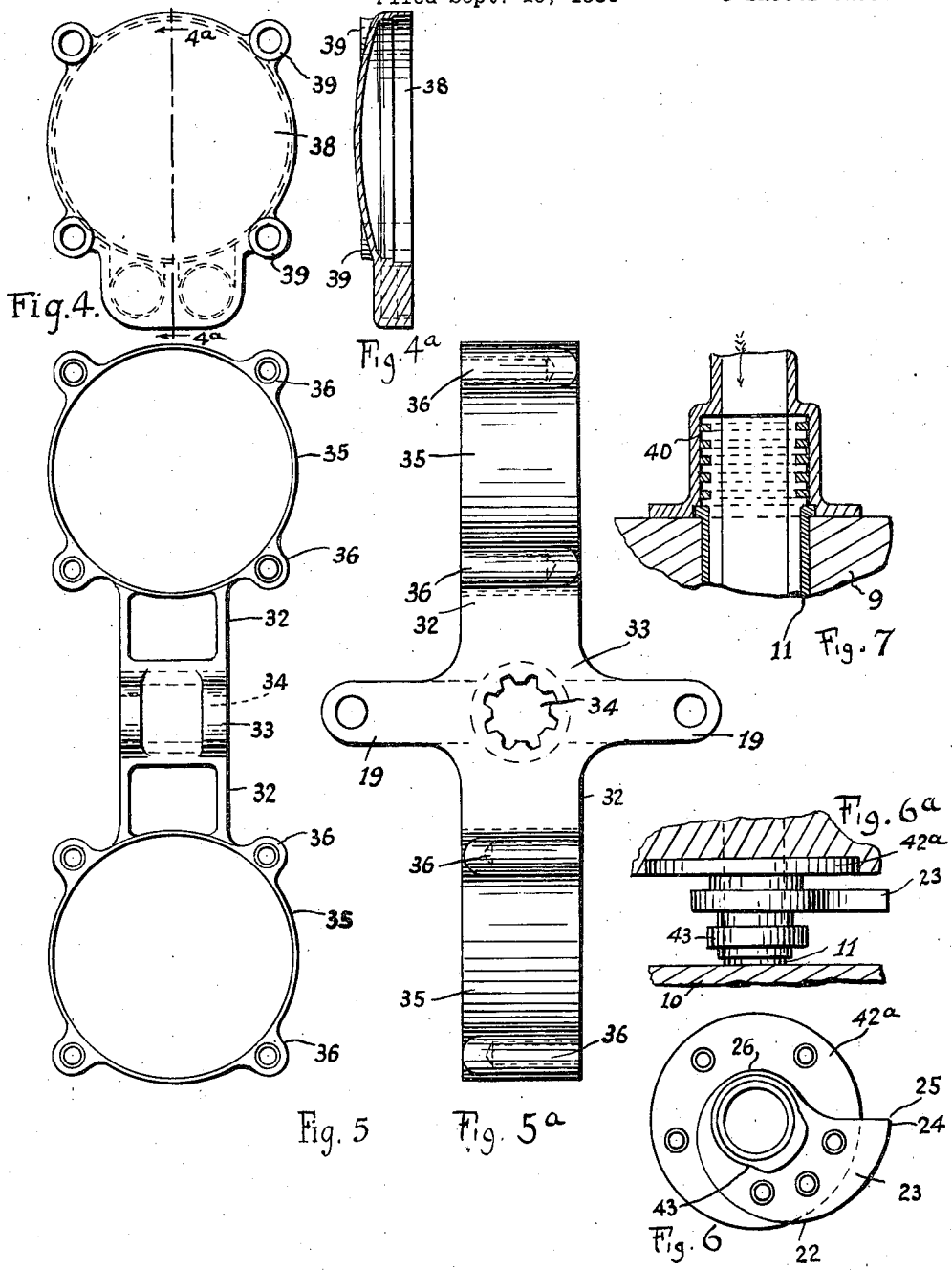

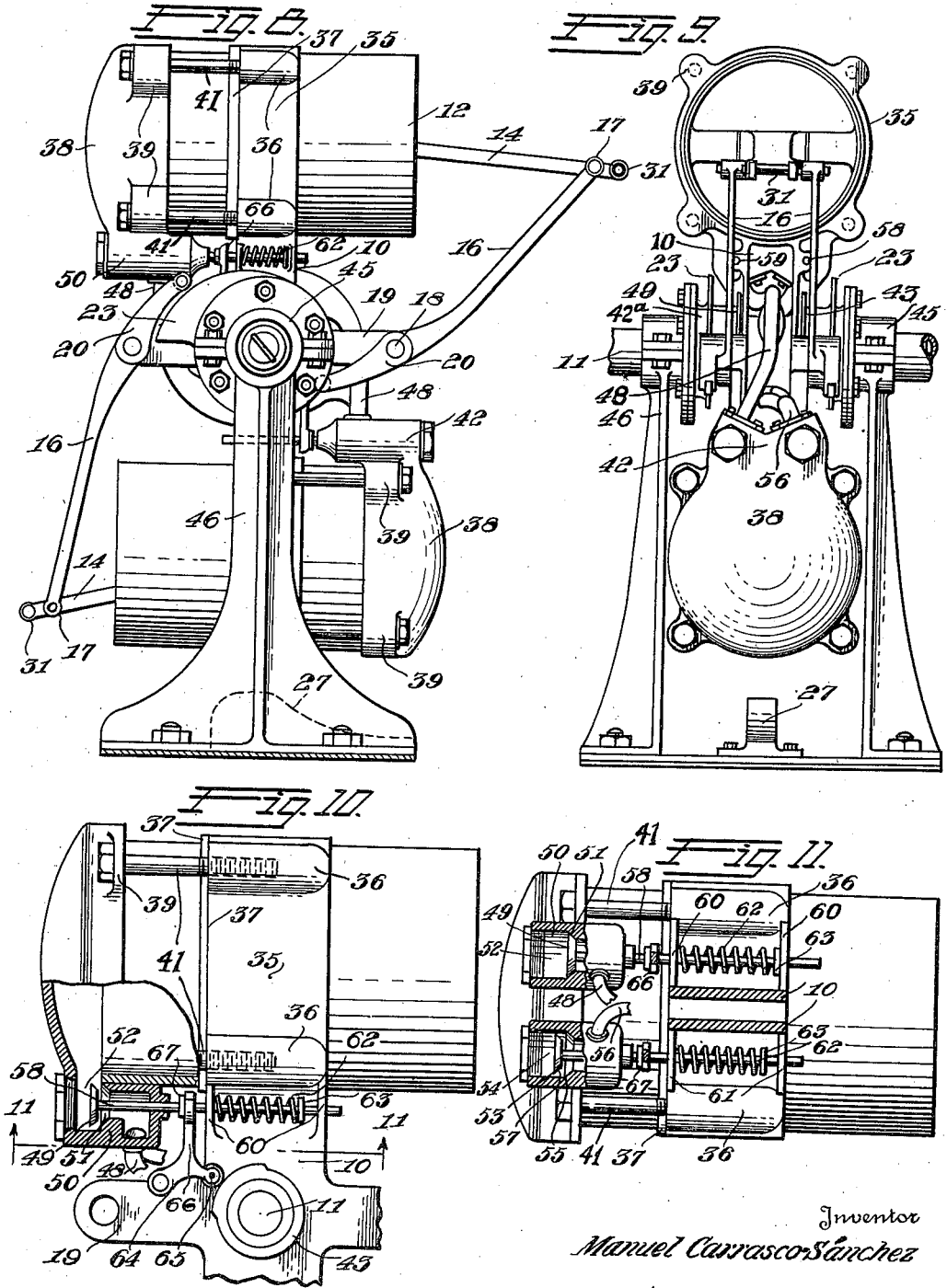

Patented Aug. 8, 1939

2,168,672

UNITED STATES PATENT OFFICE 2,168,672

MOTOR

Manuel Carrasco-Sánchez, New York, N. Y.

Application September 19, 1936, Serial No. 101,650

5 Claims. (Cl. 121—58)

The present invention relates to expansible chamber motors of the type in which cylinders and pistons are carried by a rotor, and it relates more particularly to the mechanism whereby the power acting upon the piston is utilized to rotate the rotor.

The invention may be used in a motor driven by any type of fluid pressure medium suitable to drive an expansible motor, such as steam or compressed air, or the expanding force of exploding gas as in ordinary internal combustion engines.

One object of the present invention is to provide a novel form of mechanism in such a motor whereby the thrust of the piston operates against a rigidly fixed surface, thereby causing the movement of the cylinder.

Another object is to provide novel means for causing the inward motion of the pistons in the cylinder.

A further object is to provide a novel form of bearing member against which the thrust of the piston is exerted, whereby the thrust is delivered at all times during the working stroke of the piston against a surface that is perpendicular to the axis of the thrusting member.

Still another object of the invention is to provide a novel form of cylinder head and a cooperating mounting for the cylinder, whereby the force exerted against the cylinder head is transmitted to the mounting by members other than the cylinder walls.

In the accompanying drawings:

Figure 1 is a detail view showing the mechanism for transforming the expansive force acting within the cylinder to rotary motion of the rotor.

Figure 2 is a sectional view showing the position of the parts at a different point in the operation of the motor.

Figure 3 is a plan view of a form of shaft that may be used in the motor.

Figure 3a is an end view of the shaft.

Figure 4 is a plan view of the cylinder head.

Figure 4a is a sectional view on the line 4a—4a of Figure 4.

Figure 5 is a plan view of a rotor showing the mounting for the cylinders.

Figure 5a is a side elevation of the rotor skeleton.

Figure 6 is an elevation of the cam.

Figure 6a is a detail sectional view showing a method of mounting the cam for causing the inward motion of the piston, and for operating a valve.

Figure 7 is a detail view showing a method of conducting fluid to the rotor.

Figure 8 is a side elevation showing a unit embodying the invention mounted for operation.

Figure 9 is an end elevation of such a unit.

Figure 10 is an enlarged detail view showing the intake valve and its operating mechanism.

Figure 11 is a sectional view on the line 11—11 of Figure 10.

Describing the drawings more particularly, Figures 1 and 2 disclose in detail the mechanism by means of which the force acting within the cylinder is transformed into rotary motion of the rotor.

The rotor is designated generally 9, and comprises arms 10 extending on opposite sides of a shaft 11 which revolves with the rotor, and which is the power shaft of the motor. Upon the end of each of the arms 10 is mounted a cylinder 12, the axis of which is perpendicular to the arm supporting it. Inasmuch as the axis of the cylinder forms a tangent of the circle described by the outer portion of the cylinder, the cylinders may be conveniently described as "tangentially arranged".

Each cylinder has a reciprocating piston 13 therein, such piston being provided with a piston-rod 14 that is pivoted upon a pin 15, and which is of sufficient length to extend outwardly beyond the end of the cylinder when the piston is in its innermost position, shown in Figure 2.

Adjacent the distal end of each piston-rod 14, one arm 16 of a bell crank is pivoted, as at 17. The bell crank is fulcrumed, as indicated at 18, upon a portion 19 of the rotor. The free arm 20 of the bell crank is bent inwardly toward the shaft 11, and carries a roller 21 journaled in the end thereof. The roller 21 rides over the spiral surface 22 of a stationary spiral cam 23, the cam 23 being held motionless with respect to the rotor.

The spiral surface 22 of the cam 23 merges at its outer end into a short cylindrical portion 24 that terminates sharply, as at 25. The effect of this arrangement is to cause the piston to remain at its extreme inward position for a brief period before the beginning of the power-stroke, and as the roller 21 leaves the surface 24, the bell crank is free to move under the influence of the piston without interference. Preferably the cam 23 has another limited cylindrical surface 26 in advance of the spiral surface 22 to permit a brief period of rest for the piston in the cylinder at the end of the power-stroke and before the beginning of the inward stroke of the piston. The cam just described is designed for use with a two cycle combustion engine, the surface 26 permitting a scavenging period. It will readily be appreciated that the cam may be readily changed to suit motors having other types of motive power.

In order to cause the rotor to move under the influence of the working stroke of the pistons, an abutment member 27 is rigidly fixed adjacent the rotor in any suitable manner in a position to be engaged by the end of each piston-rod 14 as the cylinder in which that rod operates delivers its stroke. The abutment maintains the piston in a substantially fixed position and consequently the cylinder and rotor are moved.

The member 27 has an inclined bearing surface 28 beginning at the end which is toward the advancing connecting rod, and which approaches the central shaft 11. During the time that the roller 21 is traveling over the cylindrical portion 24 of the cam 23, the end of the piston-rod 14 engages the surface 28 without jar or shock, and thereafter the roller 21 is slightly lifted from the surface of the cam 23 by the contact of the piston-rod with this inclined surface. The inclined surface 28 terminates in a peak 29 which the end of the piston-rod passes at the instant that the roller 21 passes the end point of the bearing surface 24 of the cam. At this time the pressure is supplied within the cylinder.

It will be appreciated that the bell-crank, being fulcrumed rigidly upon the rotor, will cause a swinging movement of the rod 14 upon its pin 15 during the power-stroke. To obtain the full effect of the thrust against the abutment member 27, it is important that the thrust be exerted against a surface perpendicular to the axis of the rod. To obtain this perpendicularity during the entire stroke, the surface 30 of the abutment member behind the peak 29 is curved in such a manner as to render the particular part, against which the end of the rod is thrusting at any time, perpendicular to the axis of the rod.

A roller 31 is advantageously journaled in the end of the connecting rod 14 to ride upon the member 27 and reduce friction.

An advantageous form of mounting upon the rotor for the cylinders and a cooperating cylinder-head is shown in Figures 4 to 5a, 8 and 9. The arms 32 of the rotor are disclosed as being of skeleton form to reduce weight and extend from a central portion 33 which has a bore 34 advantageously provided with splines for securing the rotor to a shaft. The arms 32 are provided at their respective outer ends with cylinder-carrying rings 35 provided with bolt-receiving lugs or bosses 36. The cylinders are engaged in the rings 35 and may be provided with shoulders or ribs 37, as shown in Figures 1 and 2 that abut against the rings.

The cylinders are provided with heads 38, which as shown in Figure 4, are provided with bolt-receiving lugs 39 arranged to register with the lugs 36 of the carrying rings. Bolts 41 pass through the lugs 39 and outside of ribs 37, and are threaded into the bosses 36. It will be seen that when the heads are assembled with the cylinders carried by the rings, that the thrust exerted upon the head of the cylinder, will be transmitted directly to the rotor by the bolts 41. Inasmuch as the thrust is not transmitted through the cylinder walls, these walls may be made of a light construction, thus effecting a considerable saving in weight.

As before stated, any suitable motive fluid may be used. As shown in Figures 3 and 7 the shaft 11 of the motor may be hollow and provided with suitable packings, as at 40, to provide a passage for the fluid. The fluid may be led from the shaft to the cylinders by means of suitable pipes 48 (see Figure 8), delivering to a valve chest as at 42, which contains suitable valves for controlling the admission of the fluid to the cylinders and the exhaust.

The method of mounting the spiral cam is shown in Figure 6. The cam 23 is secured to a support 42a forming the bearing member for the shaft 11. A cam 43 for operating valves may be mounted in proximity to the cam 23, and in the same manner.

It will be understood that a plurality of units formed of the rotors and cylinders with their mechanisms may be assembled upon a shaft to form a single motor. A single assembled unit is shown in Figures 8 and 9, in which a base 44 supports the rotor shaft in suitable journals 45 in upstanding arms 46. The abutment member 27 is here shown as mounted on the base 44.

Figures 10 and 11 are detail drawings showing valve-and-valve operating means that may be used in an engine such as illustrated in Figures 8 and 9. As previously described the pipe 48 connects the hollow shaft 11 to the valve chest 42. The valve chest contains an admission valve 49 of the poppet type, that operates longitudinally in a chamber 50 into which the pipe 48 leads upon one side of the valve seat 51. An intake port 52 opens into the cylinder.

The exhaust chamber 53 is similar to the intake chamber, having an exhaust port 54 entering the chamber upon one side of the seat 55 and an exhaust pipe 56 leading from the chamber upon the other side of the seat. An exhaust valve 57 cooperates with the seat 55 to alternately open and close the exhaust line of the cylinder.

The valves 49 and 57 have stems 58 and 59 respectively that extend beyond the valve chamber and are slidably engaged in openings 60 through flanges 61 extending from the rotor arm 10, that supports the cylinder. Between the flanges and surrounding the rods 58 and 59, respectively are spiral compression springs 62 that at their opposite ends engage the flange 61 that is closer to the valve chest 42 and collars 63 carried by the rods to urge the valves 49 and 57 to closed position.

To open the valves a bell crank 64 is pivoted to each side of the rotor arm 19. One arm 65 of each crank engages the surface of the cam 43 upon that side of the rotor and the other arm 66 engages a bearing member 67 upon the valve rod. The cams 43 are so positioned with respect to the cams 23 that the valves are opened and closed at the proper times to admit the pressure fluid to the cylinder for the power-stroke and to permit the fluid to exhaust during the exhaust stroke of the piston.

The above described arrangement is designed for use when the motor is to be operated by an expansive fluid, such as compressed air or steam. When other types of motive fluid are used, the mechanism may be readily altered to adapt it to the power to be utilized.

The operation of the above described assembly will now be described. The operation of only one cylinder will be considered, since the operation of both cylinders carried by the arms 10 of the rotor is similar. With the parts in the positions shown in Figure 2 at the beginning of the power-stroke, the pressure of the motive fluid is released within the cylinder. With the valve arrangement shown in Figures 10 and 11 the admission valve will be open and the exhaust valve closed. As the piston 13 moves outwardly under the influence of pressure within the cylinder, the end of the piston-rod 14 will, due to the swinging action of the fulcrumed arm 16 of the bell crank, describe a definite path, and will deliver the thrust of the piston against the surface 30 of the abutment member 27. The surface being curved in accordance with the definite travel of the piston-rod so that the axis of the rod is always at a right angle to that portion of the surface with which the roller at the end of the rod is passing at any time, the entire thrust is delivered by the piston against an entirely rigid assembly and the thrust will be expended only in moving the cylinder head and consequently the rotor.

At the beginning of the power-stroke, the roller 21 of the bell crank arm 20 leaves the surface 24 of the cam 23 and because of the sharp drop the crank is unsupported by the cam, this being permitted by the perpendicular relation between the piston-rod and the surface 30. At the end of the power-stroke, the roller 21 begins to mount the spiral surface of the cam 23, and through the bell crank, the piston is moved inwardly to cause the exhaust stroke, the exhaust valve 57 being opened by its cam 43 and bell crank 64 at the beginning of such strokes. When the roller 21 reaches the cylindrical portion 24 of the cam 23, the exhaust valve closes. At this time, the roller 31, at the end of the piston-rod engages the surface 28 of the abutment 27, and as the rotation continues, raises the roller 21 from contact with the cam 23. As the end of the piston-rod 14 reaches the peak between the surfaces 28 and 30, the admission valve 49 is opened and the cycle is repeated.

The machine has many advantages. Due to the method of arranging the transmission-parts, there is little loss of power through friction or waste motion. The mounting of the cylinders and the structure of the heads provides for the direct transmission of power, without the necessity for heavy parts. The rotor and cylinders have the effect of a flywheel as they revolve. The small number and simple character of the moving parts makes a motor embodying the invention inexpensive to build, and yet such a motor is exceptionally efficient.

It will be appreciated that the leverage force exerted upon the shaft may be varied by changing the distance of the cylinders from the shaft.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In an expansible chamber motor including a rotor mounted upon an axle, a tangentially arranged cylinder carried by the rotor, a piston reciprocable in the cylinder and having a piston-rod pivoted thereto and extending beyond the end of the cylinder, means for releasing fluid pressure within the cylinder to create a power-stroke of the piston during a portion of the rotation of the rotor, and means for permitting the escape of exhaust during another portion of the rotation, a stationary abutment member mounted adjacent the rotor and having a longitudinally concave bearing-surface extending in the direction of rotation of the rotor for engagement by the end of the piston-rod during the power-stroke, a bell crank fulcrumed upon the rotor and having one arm pivoted to the piston-rod adjacent the outer end thereof, and a stationary, spiral cam surrounding the axle, the bearing surface of the said cam being engaged by the other arm of the bell-crank and having a sharp-drop arranged to be encountered by the end of the bell-crank just prior to the beginning of the power-stroke, the cam and bell-crank being so arranged that the piston is moved inwardly during a portion of the rotation other than that during which the power-stroke occurs and is released from action of the cam and crank during the power-stroke, and the axis of the piston-rod is maintained at all times during the power-stroke substantially perpendicular to that portion of the concave bearing surface of the stationary abutment member with which the end of the piston-rod is engaged.

2. In a rotary expansible chamber motor, a rotor mounted upon an axle and including a skeleton arm extending from the axle, a ring carried by the arm and having its axis tangential to the circle described by its rotation with the rotor about the center of the axle, a cylinder having its central portion engaged in the ring and extending axially upon either side of the ring, the said cylinder having a circumferential rib engaging the ring upon one side thereof, a head upon the end of the cylinder on the same side of the ring as the rib and spaced from the rib, and screw threaded means connecting the head and the ring to secure the cylinder together so that the rib abuts the edge of the ring.

3. In an expansible chamber motor including a rotor, a tangentially arranged cylinder carried by the rotor, a piston reciprocable in the cylinder and having pivoted thereto a piston-rod that extends beyond the cylinder, means for releasing fluid pressure within the cylinder to create a power-stroke during a portion of the rotation of the rotor, and means for permitting the fluid to escape during a portion of the rotation between power-strokes; a stationary abutment member mounted adjacent the rotor for receiving the thrusts of the piston during the power-stroke, the said abutment having a contact surface curving gradually toward the rotor for engagement by the end of the piston-rod prior to the beginning of the power-stroke, and a concave bearing surface joining the contact surface at an angle at the point passed by the end of the piston-rod at the beginning of the power-stroke, and means for moving the piston inwardly in the cylinder during a portion of the rotation of the rotor occurring between power-strokes, said means operating to hold the piston motionless in the cylinder for a brief period immediately prior to the engagement of the end of the piston-rod with the contact surface of the abutment member, and said means also operating to swing the piston-rod upon its pivot during the power-stroke to maintain the axis of the piston-rod at right angles to the surface of the abutment member during the power-stroke.

4. In an expansible chamber motor including a rotor, a tangentially arranged cylinder carried by the rotor, a piston reciprocable in the cylinder and having a piston-rod extending beyond the end of the cylinder, means for releasing fluid pressure within the cylinder during a portion of the rotation of the rotor to produce a power-stroke, and means for permitting the fluid to exhaust during a portion of the rotation occurring between power-strokes, the combination with a stationary cam positioned adjacent the rotor, means movably mounted upon the rotor for engaging the cam during a portion of the rotation occurring between the power-strokes and being moved thereby, said means being operatively connected with the piston-rod to transmit inward motion thereto, of a stationary abutment positioned adjacent the rotor and having a bearing surface adapted to be engaged by the end of the piston-rod during the power-stroke, said bearing surface being curved to maintain the piston-rod and piston against axial motion and to correspond to the curve described by the end of the piston-rod during the power-stroke.

5. In an expansible chamber motor including a rotor, a tangentially arranged cylinder carried by the rotor, a piston reciprocable in the cylinder and having a piston-rod extending beyond the end of the cylinder, means for releasing fluid pressure within the cylinder during a portion of the rotation of the rotor to produce a power-stroke, means for permitting the fluid to exhaust during a portion of the rotation occurring between power-strokes, and a stationary abutment positioned adjacent the rotor and having a bearing surface for engagement by the end of the piston-rod during the power-stroke, said bearing surface being arranged to maintain the piston-rod and piston substantially against axial motion during the power-stroke; a stationary cam mounted adjacent the rotor, and means movably mounted on the rotor for engaging the cam during the portion of the rotation when the fluid is permitted to exhaust from the cylinder and being thereby moved, said movable means being connected with the piston to move it inward in the cylinder when the movable means is moved by the stationary cam.

MANUEL CARRASCO-SÁNCHEZ.